United States Patent [19]

Vreenegoor

[11] Patent Number: 4,530,807

[45] Date of Patent: Jul. 23, 1985

[54] PRODUCTION OF POLYMERIC FOAM

[75] Inventor: Nicholas C. Vreenegoor, Bennebroek, Near Hillegom, Netherlands

[73] Assignee: Unifoam AG, Glarus, Switzerland

[21] Appl. No.: 610,494

[22] Filed: May 15, 1984

[30] Foreign Application Priority Data

May 20, 1983 [GB] United Kingdom ............... 8314010

[51] Int. Cl.³ .......................................... B29D 27/04
[52] U.S. Cl. ...................................... 264/51; 264/37; 264/46.4; 264/297.1; 264/299; 264/331.11; 264/DIG. 84; 425/62; 425/88; 425/258; 425/447; 425/817 R
[58] Field of Search ............... 264/DIG. 84, 51, 46.4, 264/297.1, 299, 331.11; 425/88, 256, 258, 447, 448, 37, 62, 817 R

[56] References Cited

U.S. PATENT DOCUMENTS

| | | | |
|---|---|---|---|
| 806,371 | 12/1905 | Siegwart | 425/62 |
| 2,852,931 | 9/1958 | Bonet | 425/447 X |
| 3,090,078 | 5/1963 | Ackles | 264/261 X |
| 3,197,531 | 7/1965 | Wilbur, Jr. | 264/299 X |
| 3,296,346 | 1/1967 | Shannon | 425/447 X |
| 3,551,947 | 1/1971 | Jennings | 264/51 X |
| 3,599,282 | 8/1971 | Meyers et al. | 264/54 X |
| 3,786,122 | 1/1974 | Berg | 264/DIG. 84 |
| 3,833,693 | 9/1974 | Ross | 425/447 X |
| 4,032,275 | 6/1977 | Schwab et al. | 264/DIG. 84 |
| 4,074,960 | 2/1978 | Dockray et al. | 264/DIG. 84 |
| 4,093,109 | 6/1978 | Schrader | 264/DIG. 84 |
| 4,216,181 | 8/1980 | Ebeling et al. | 264/DIG. 84 |
| 4,246,356 | 1/1981 | Walmsley | 264/DIG. 84 |
| 4,298,557 | 11/1981 | Bradford et al. | 264/DIG. 84 |
| 4,363,610 | 12/1982 | Murray et al. | 264/DIG. 84 |

FOREIGN PATENT DOCUMENTS

| | | |
|---|---|---|
| 058 | 12/1978 | European Pat. Off. .... 264/DIG. 84 |
| 1225968 | 3/1971 | United Kingdom . |
| 1235915 | 6/1971 | United Kingdom . |
| 1354341 | 5/1974 | United Kingdom . |
| 1564604 | 4/1980 | United Kingdom . |

Primary Examiner—Philip Anderson
Attorney, Agent, or Firm—Laubscher & Laubscher

[57] ABSTRACT

Polymeric foam, particularly polyurethane foam block, is produced in a stationary, longitudinally-extending, channel-shaped, mould (1a). A mixture of foam reactants partially expands in a vessel (40) and overflows down a fall plate (41) to the bottom of the mould. The vessel and fall plate are progressively transported from one end of the mould to the other to lay down partially expanded foam over the bottom of the mould (FIG. 1). The ends (11,12) of the mould may be opened to permit entry and exit of a foam lay-down unit (6) and transporting means (7) and to permit removal of the expanded foam strand (61) (FIGS. 6 and 7). The mould may be covered (14) after foam lay down and means (5) may be provided for removing gases emanating from the foam (FIG. 1).

13 Claims, 8 Drawing Figures

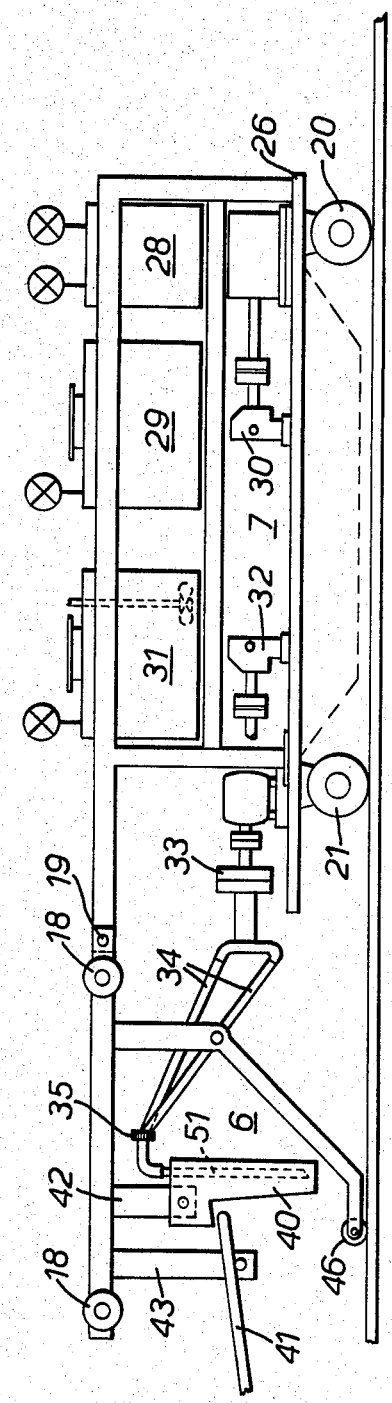
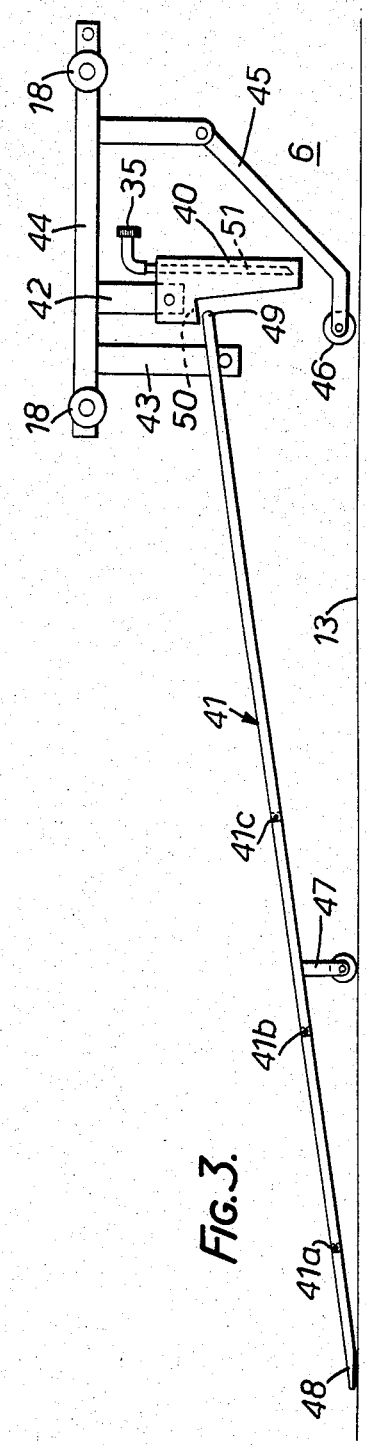
FIG.2.
FIG.3.

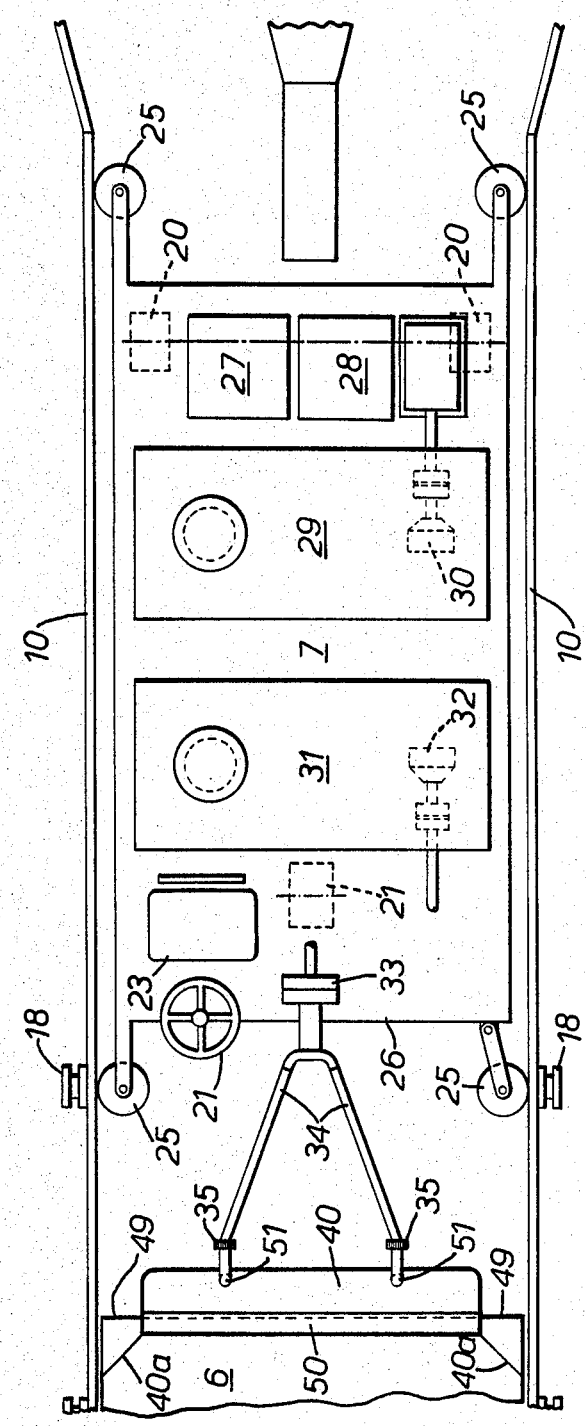

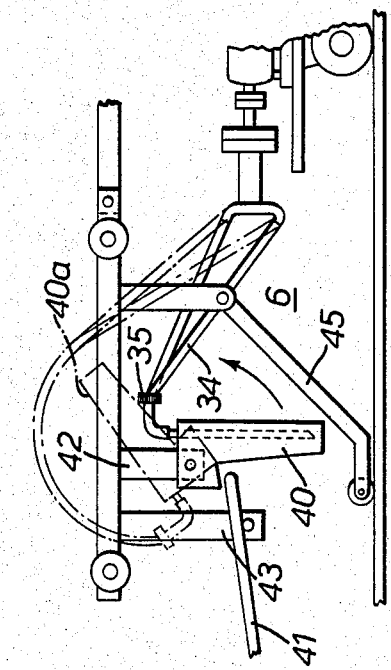
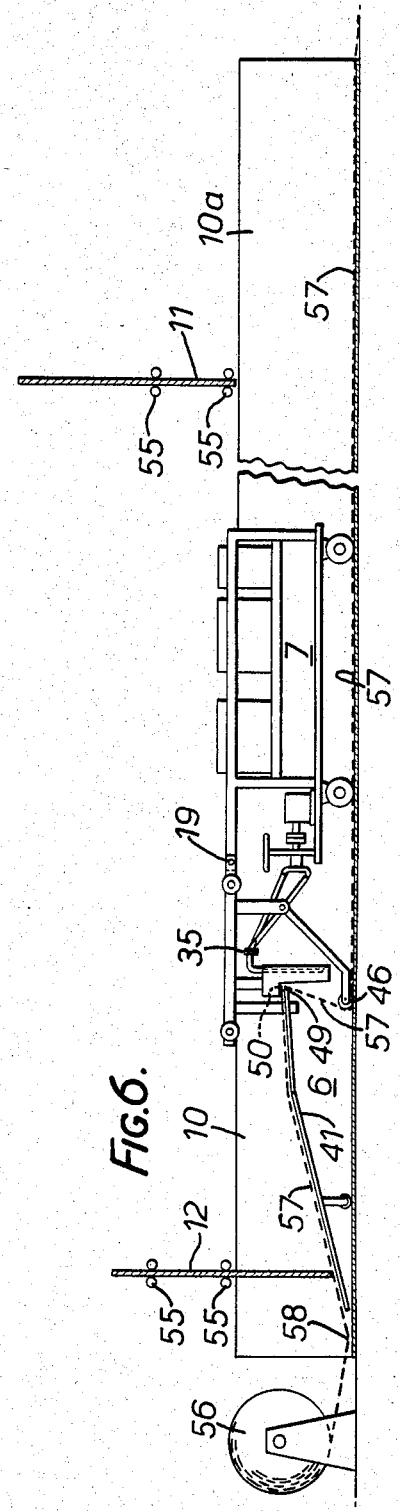

PRODUCTION OF POLYMERIC FOAM

This invention relates to the production of polymeric foam and, in particular, to the production of blocks or slabs of polyurethane foam.

It is well-known to produce polyurethane foam blocks by depositing a mixture of liquid foam reactants onto the bottom of a continuous open topped channel-shaped conveyor and allowing the foam to rise freely due to chemical reaction until fully-expanded foam is obtained. The foam is then allowed to cure and, subsequently, is cross-sawn into blocks for eventual conversion into, for example, mattresses or cushions. Typically, an apparatus for such production is 50 meters long and produces a continuous length of foam having a cross-section of, say, 2 meters wide and 80 centimeters high.

The channel-shaped conveyor is usually formed from a sheet or sheets of paper arranged to constitute the bottom and two vertical sides of the channel, the bottom moving on and with a belt conveyor and the sides sliding past rigid retaining walls or being supported by moving retaining walls which move with the belt conveyor. Foam reactants are mixed in a mixing head and may be fed to the channel conveyor through a reciprocating nozzle or by way of a trough in which the reactants partially-expand. Details of such production methods and apparatus are to be found in the specifications of our British Pat. Nos. 1,225,968, 1,235,915, 1,354,341 and 1,564,604, among others.

Such apparatus is expensive and large in size, therefore requiring a large area for installation and operation. Consequently, economic considerations require that the production capacity of the apparatus should be utilized to the full and this, in turn, requires that an appropriate market is available to absorb the high-volume output of the product. There are many areas of the world where the market for such product is restricted, so that the use of apparatus of the aforementioned kind cannot be justified. Furthermore, even in areas where there is a substantial demand for the product, transportation costs throughout a wide area from a central production plant are such that significant economies can be achieved by replacing or supplementing the central production plant by several smaller, more economical, production plants distributed over the area.

It is therefore the primary object of the present invention to provide methods and apparatus for producing polymeric foam, in particular polyurethane foam blocks, which are suitable for relatively small-scale production and which involve reduced capital expenditure, installation area and operating costs.

In general the invention proposes to produce polyurethane foam blocks by forming a strand of expanded foam in a stationary, longitudinally-extending, channel-shaped, mould and thereafter cutting the strand of expanded foam into the required-size blocks. The production of expanded foam in a stationary mould is well-known per se. For example, U.S. Pat. No. 3,599,282 proposes a travelling mixing head movable over and between a plurality of individual moulds to dispense a mixture of foam reactants to each mould. However, this and other known methods and apparatus employing a stationary mould must be limited to moulds having relatively small dimensions, e.g. no more than 1 meter wide and two meters long, in order that the rising, expanding foam is sufficiently supported by the mould side walls. Moreover, unless the mould has a bottom area very much less than the example mentioned, it is necessary to incline the bottom of the mould in order to achieve the necessary distribution of the initial mixture of foam reactants; the latter being a milky liquid at that stage. Such prior proposals are incapable of producing a strand of foam having a length many times the strand widths and from which a plurality of standard slabstock blocks, typically 2 meters wide by 1 meter high by 3 meters long, may be cut.

According to the invention there is provided apparatus for the production of polymeric foam, comprising a longitudinally-extending channel-shaped mould and lay-down means for depositing a mixture of foam reactants in said mould and comprising a vessel in which liquid foam reactants may expand upwardly, supply means for supplying liquid foam reactants to said vessel, a weir structure associated with said vessel so that foam rising by expansion in said vessel will flow over said weir structure, and a downwardly inclined fall plate extending between said weir structure and the bottom of the mould; characterised in that said mould is maintained stationary, said lay-down means is mounted for transportation along the mould and extends downwardly within the mould to the bottom of the mould, and means are provided for progressively transporting said lay-down means from one end of the mould to the other end of the mould; thereby progressively to lay down partially expanded foam, over the bottom of the mould.

Preferably, means are provided for enclosing the mould and containing gases emitted during foam production.

The invention also provides a method of producing polymeric foam in a longitudinally-extending channel-shaped mould, comprising the steps of continuously supplying a mixture of liquid foam reactants to the bottom of a vessel, allowing the mixture to expand upwardly in said vessel due to chemical reaction between said reactants, prior to completion of expansion of the mixture allowing partially-expanded foam to flow from said vessel over a weir structure and down a fall plate so that foam is deposited on the bottom of said mould; characterised by maintaining said mould stationary, mounting said vessel and fall plate transportably within the mould so that the fall plate extends downwardly to the bottom of the mould, and progressively transporting said vessel and fall plate from one end of the mould to the other end of the mould; thereby to progressively lay down partially expanded foam over the bottom of the mould.

The various features and advantages of the invention will become apparent from the following description taken in conjunction with the accompanying diagrammatic drawings, in which:

FIG. 1 is a simplified representation of one embodiment of a foam production installation in accordance with the invention, shown in perspective;

FIGS. 2 and 3, taken together, show a side view of a combined foam lay-down unit and metering unit of the invention;

FIG. 4 shows a plan view of that part of the combination of units shown in FIG. 2;

FIG. 5 shows a side view of part of the lay-down unit with the trough in a tilted position;

FIG. 6 shows a vertical cross-section along a mould with lay-down and metering units located for the commencement of foam production;

The present invention comprises many features and no single drawing shows all the features. Furthermore, individual drawings omit certain details (shown in other drawings) which are not directly relevant to the related description. Like details are given like references throughout the drawings.

Figure 1:
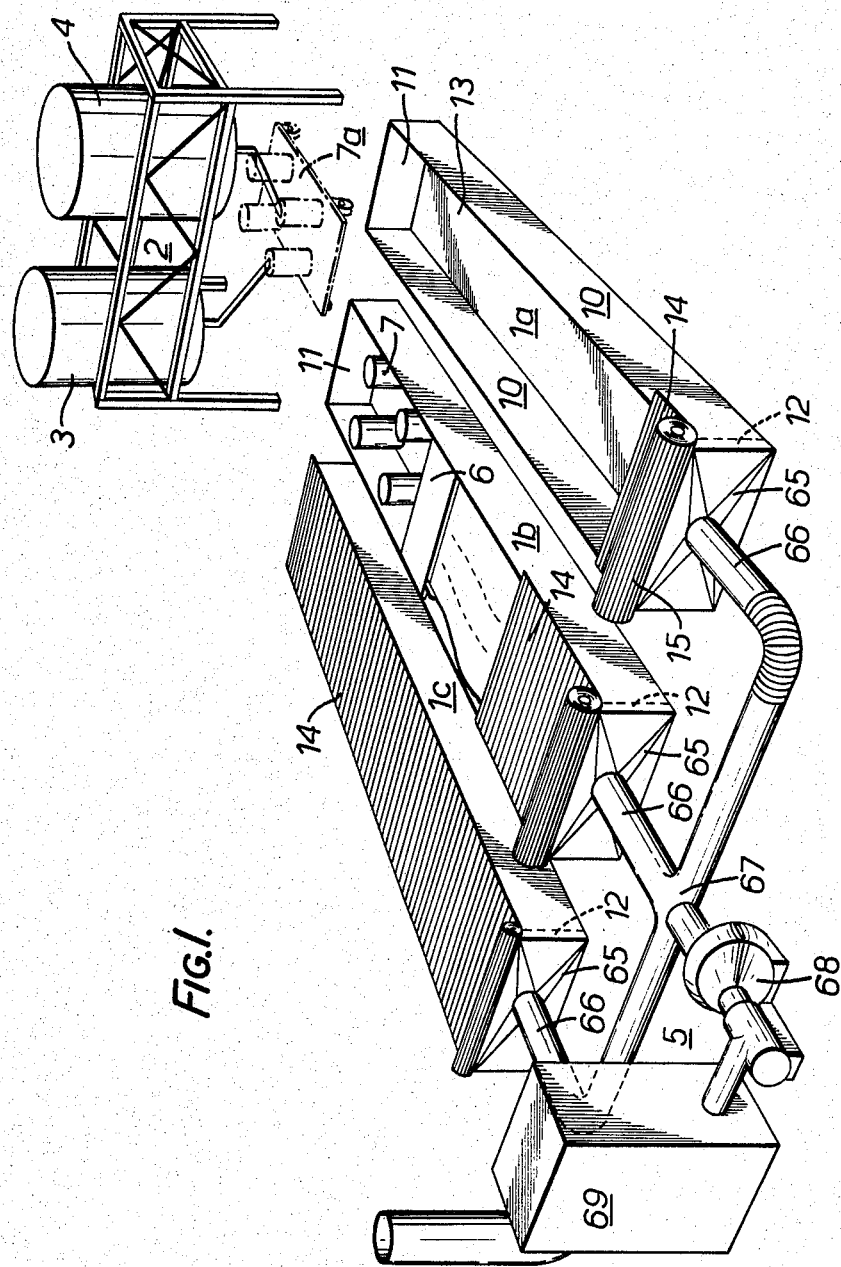

Referring to FIG. 1, this shows a much-simplified diagrammatic view of a typical installation of apparatus according to the invention. A number of details to which reference will now be made are not shown in this figure but will be elaborated, with reference to other figures, hereinafter. The installation comprises three similar rectangular open-topped moulds 1a, 1b and 1c, arranged side-by-side in spaced relationship as shown. The length of the moulds may be between 30 to 100 meters. In the vicinity of one end of the moulds is a tank farm 2 comprising an appropriate number of storage tanks such as 3, 4 for the respective foam reactants. Connected to the opposite ends of the moulds is an optional extractor system, generally referenced 5. The combination of a transportable foam lay-down unit 6 and metering unit 7 (briefly indicated in this figure) is shown in one position mid-way along the mould 1b and the detail 7a in the tank farm 2 represents the same metering unit 7 in a different position.

Referring to the mould 1a, each mould comprises two longitudinal side-walls 10, an end wall 11 and a similar end wall 12 at the opposite end of the mould. The bottom 13 of the mould may be constituted by a structural element e.g. a flat panel, or by the ground surface on which the mould walls are erected. Preferably, and as shown, each mould has a cover 14 extendable down the length of the mould from a roll 15. The cover of the mould 1a (which is empty) is shown in the fully-stowed position, that of mould 1b (in which foam lay-down is in progress) partially extended and that of mould 1c (in which expanded foam is curing) fully extended.

On or adjacent the top edge of each side wall 10 is a rail (not shown) extending the length of the mould for supporting and guiding wheels mounted each side of the lay-down unit 6. The metering unit runs on the bottom of the mould and transports the lay-down unit, as will be described.

Details of the transportable foam lay-down unit 6 and metering unit 7 are shown in FIGS. 2 to 5 in which the lay-down unit 6 is mounted on wheels 18 which run on the aforementioned rails each side of the mould. The unit 6 is connected by a releasable coupling 19 to a framework of the metering unit 7, which is a battery-powered vehicle having a pair of driven wheels 20 and a wheel 21 steerable through a steering wheel 22 by an operator seated on a seat 23. All three wheels 20 and 21 have pneumatic tyres. As seen in plan (FIG. 4), the unit 7 is provided with lateral guide wheels 25 which run against the mould side walls 10 to assist in guiding the vehicle in the mould.

Mounted on the platform 26 of the unit 7 are an appropriate number of storage tanks, such as 27, 28 and 29 which, together with appropriate pumps such as 30, are interconnected so that a mixture of foam chemicals from the respective storage tanks may be supplied to a pre-mix tank 31. The outlet of the tank 31 is connected through a pre-mix metering pump 32 to a mixing head 33 which delivers to a pair of flexible pipes 34 terminating in releasable pipe couplings 35. Details of how the various components of the metering unit function and are to be operated in order to produce a desired mixture of foam reactants through the pipes 34 will be well known to those skilled in the art.

The lay-down unit 6 comprises (see particularly FIG. 3) a container or trough 40 and a fall plate 41, each supported by respective extensible arms 42 and 43 from a framework 44 of the unit. Said wheels 18 are attached to the framework, which also supports pivoted arms 45 carrying a roller 46 which extends substantially across the internal width of the mould. The fall plate 41 is in sections pivotally interconnected at 41a, b and c whereby, (by means not shown), the counter of the fall plate may be adjusted. The fall plate is supported by wheeled legs 47 so that the free end 48 is held with minimum clearance from the bottom 13 of the mould. The upper end 49 of the fall plate underlies a lip or weir structure 50 of the trough 40. Feed pipes 51 are mounted within the trough 40, extending upwardly from adjacent the bottom of the trough to the coupling 35.

At the end of foam lay-down, it is necessary to empty the trough of foam (as will be described). To facilitate this, the trough is pivotally mounted on the arms 42 so that, as shown in FIG. 5, the trough may be swung upwardly between the arms 45 to the position shown at 40a. The flexible pipes 34 may be sufficiently long to allow this to occur, or the couplings 35 may be released.

When the combination of units 6 and 7 is located within a mould, as indicated in FIG. 1, the lay-down unit 6 is transportable along its rails by the vehicular metering unit 7 through the coupling 19. As will be described hereinafter, the mould end wall 11 is movable to permit the unit 7 to be driven out of the mould, the couplings 19 (and 35) being released when the lay-down unit 6 reaches the end of its rails. Alternatively, the couplings 19 are such that the lay-down unit will be retained and supported in its position on the framework of the metering unit so that it may be removed from the mould together with the metering unit.

Figure 7:
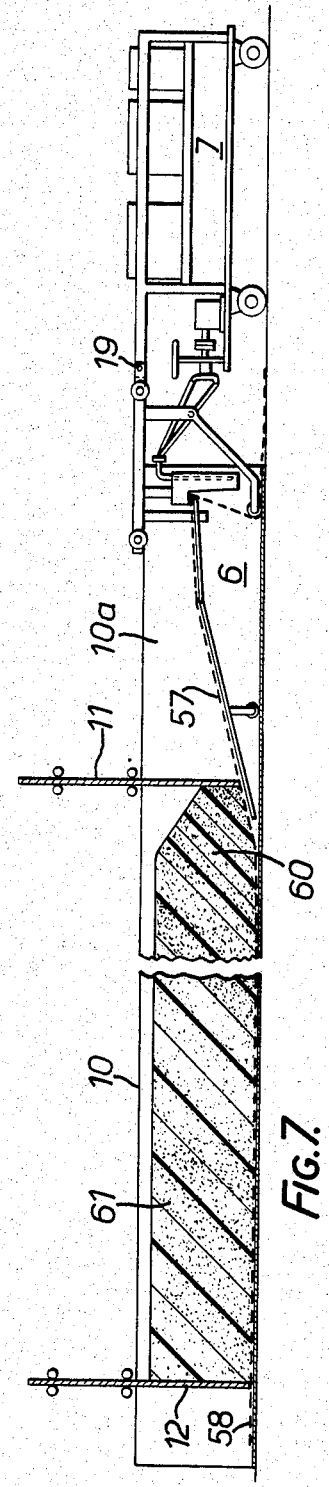
FIG. 7 shows a view similar to that of FIG. 6 with the lay-down and metering units located near the completion of foam production.

Referring to FIG. 6, the end walls 11 and 12 are mounted on guides, indicated at 55, so that they may be positioned vertically between the mould side walls 10 or fully withdrawn to the position shown for end wall 11 in which the metering unit 7 may be driven into, or out of, the mould. Also, the lay-down unit 6 may be moved under the end wall on extensions 10a of the side walls 10 (as seen in FIG. 7), the aforementioned rails continuing along said side wall extensions. Located adjacent the end wall 12 is a supply roll 56 of polyethylene film to serve as the bottom lining of the mould.

FIG. 6 shows the apparatus, as so far described, in readiness for the commencement of foam lay-down and FIG. 7 shows the apparatus just prior to completion of foam lay-down. In use, with the lay-down unit 6 in a position similar to that shown in FIG. 7, both end walls are fully lowered and the inner mould faces of the side walls and end walls covered with a foam release medium. This may be paper or polyethylene sheet affixed to the walls or a coating of a suitable release agent. Both end walls are then fully raised and the lay-down unit 6, uncoupled from the metering unit 7, is manhandled to the position shown in FIG. 6 adjacent the end wall 12. Sheet from the supply roll 56 is pulled into the mould, over the fall plate 41, around the upper end 49 of the fall plate, down around the roller 46, and then along the full length of the mould to a sufficient distance beyond the end wall 11. This sheet constitutes the bottom lining of the mould and is indicated by broken line 57. The sheet may then be severed from the supply roll and its end anchored, as at 58.

In order to produce an overlap seal with the side walls, the width of the bottom lining sheet is wider than the mould width; for example, so as to provide an excess width of 100 mm. at each side of the mould. Where the bottom lining extends along the bottom of the mould, the excess width portions are folded back to lie flat against the main portion of the lining sheet and this is continued around the roller 46 up to the edge 49 of the fall plate. At this point, the excess portions are guided to lie vertically against the side walls and remain in that position along the fall plate 41. Referring to FIG. 4, the trough 40 does not extend the full width of the mould and includes guides 40a for containing foam passing over the lip 50. When the bottom lining sheet is installed, the excess widths are passed vertically around the ends of the guides 40a and, during operation of the apparatus, are continuously lifted to the vertical position by these guides.

After the bottom lining has been installed, the end wall 12 is lowered so as to have minimal clearance with the fall plate and bottom sheet, as shown in FIG. 6. The metering unit 7, having been driven to the tank farm 2 (FIG. 1) and its storage tanks replenished, is then driven into the mould, over the bottom lining 57, up to the lay-down unit and the couplings 19 and 35 connected, as in FIG. 6.

The pumps and associated equipment on the metering unit are operated to supply a mixture of foam reactants to the bottom of trough 40, where it reacts and begins to expand upwardly, partially-expanded foam overflowing over the lip 50 onto the bottom lining 57 where the foam substantially completes the expansion process as it passes down the fall plate 41. The method of laying down foam, using an open-topped container and allowing partially-expanded foam to overflow onto a fall-plate having an adjustable contour is fully described in the aforementioned specification of our British patent No. 1,354,341. The foam builds up against the wall 12 and at an appropriate stage in the foam expansion process, the metering unit is driven to move the lay-down unit away from the end wall 12 at an appropriate speed and the end wall 12 is gradually lowered to the bottom of the mould. As the lay-down unit is moved along the mould (see mould 1b in FIG. 1) the bottom lining 57 moves through the lay-down unit and there is minimal relative movement between the lining and the expanding foam. The aforementioned "appropriate stage" and "appropriate speed" will be determined by an experienced operator by reasonable trial and error, as is usual in foaming operations.

As the lay-down unit approaches the vicinity of end wall 11, the supply of the mixture of foam reactants from the metering unit is stopped and the trough 40 is swung upwardly (FIG. 5) to empty the trough. The end wall 11 is then lowered to have minimal clearance with the fallplate, as seen in FIG. 7, until it eventually closes on the bottom of the mould. Expanding foam 60 builds up against the end wall 11 so that, when fully expanded, it has the same height as the expanded foam 61.

While the expanded foam is left to cure in the mould, the lay-down unit may be transported by the metering unit to another mould (FIG. 1). Alternatively, if moulds are of different widths, each mould can be provided with an appropriately-dimensioned lay-down unit and a single metering unit used to service all the lay-down units.

Foam lay-down, expansion and curing may take place in an open mould. However, it is preferable to control the ambient atmosphere and the escape of noxious gases. One embodiment of such means is shown in FIG. 1, comprising the mould covers 14 and extractor system 5. The maximum height of the fully-expanded foam is chosen so that a space (e.g. 5 to 10 cms. high) is left between the foam and the cover 14. This space communicates, at the end wall 12, with a gas collection chamber 65 to which suction is applied along flexible pipes 66 connected by way of a manifold 67 to an extractor fan 68. The fan passes the gases to a scrubbing unit 69. If desired the leading end of the respective cover 14, which may be a simple sheet of flexible plastics material or may be in the form of a venetian blind, may be attached to the lay-down unit 6 so that the cover is drawn out as the foaming operation proceeds. Possibly, foam reactants such as trichloromono-fluoromethane (TCFM) may be collected from the scrubbing unit 69 for re-cycling.

A more comprehensive system for ambient atmosphere and gas control is described in our co-pending application no. of even date claiming priority from, inter alia, our British patent application no. 8314010.

After the expanded foam has cured, the foam block must be removed from the mould and cut, usually with a bandsaw into smaller blocks or buns. For this purpose, the mould cover (where used) is removed or opened and one or both end walls 11,12 raised. Conceivably, the block could be cut into buns while still in the mould, as by constructing the mould side walls 10 of separate panels of a length corresponding to the length of a bun and leaving narrow gaps between adjacent panels to permit entry of a band saw. Preferably, the block as a whole is moved out of the mould on a base board constituting the mould bottom.

Figure 8:
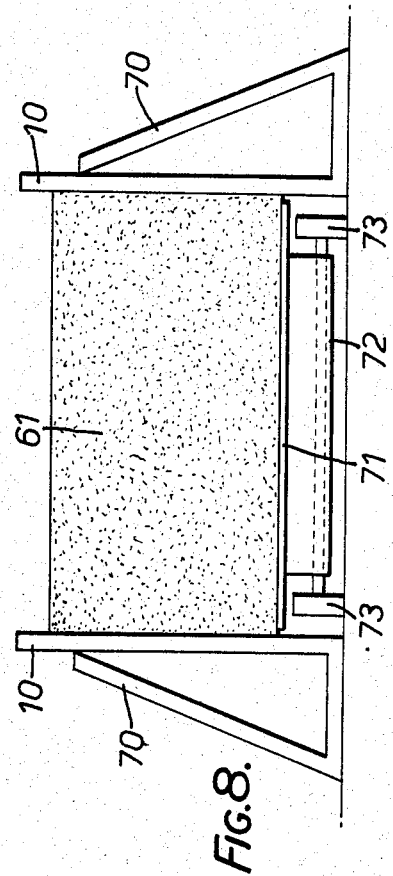
FIG. 8 shows an end view of a modified mould of the invention.

Referring to FIG. 8, the mould side walls 10 are shown supported by struts 70. The bottom of the mould is formed by a base board 71 spaced from ground level by about 15 cm. and mounted on a structure 72 including wheels 73, further structures 72 being provided at appropriate intervals down the length of the base board. The width of the base board is slightly less than that of the mould so that the base board, with the foam block 61, may be hauled out of the mould to a cutting station (not shown). It is envisaged that the base board 71 might be in individual sections corresponding to the length of a bun so that, as each section emerges from the mould, the related bun section can be cut from the block and removed from the site on the wheeled baseboard section.

Referring to FIGS. 6 and 7, if a raised mould bottom is incorporated then a suitable ramp (not shown) is provided for the metering unit 7. Also the supply roll 56 (FIG. 6) must be removable if the foam block is to emerge from that end of the mould and may be hoisted clear or, where more than one mould is provided, be mounted on transport means (not shown) so that it may be aligned with the other moulds for supplying them with bottom lining.

In a modification of the invention, the metering unit 7 may be arranged to travel outside and alongside the mould, not entering the mould for any purpose. In this case, the mechanical coupling between the lay down unit 6 and the metering unit are suitably modified and the coupling and the flexible pipes 34 extend over the sidewall of the mould.

Although the invention has been described with reference to an embodiment comprising a group of three moulds, it will be apparent that the invention is applicable to a single mould or any number of moulds.

I claim:

1. A method of producing polymeric foam in a longitudinally-extending channel-shaped mould, comprising the steps of continuously supplying a mixture of liquid foam reactants to the bottom of a vessel, allowing the mixture to expand upwardly in said vessel due to chemical reaction between said reactants, prior to completion of expansion of the mixture allowing partially-expanded foam to flow from said vessel over a weir structure and down a fall plate so that foam is deposited in said mould; characterised by maintaining said mould stationary, mounting said vessel and fall plate transportably within the mould so that the fall plate extends downwardly to the bottom of the mould, and progressively transporting said vessel and fall plate from one end of the mould to the other end of the mould; thereby to progressively lay down partially expanded foam over the bottom of the mould.

2. Apparatus for the production of polymeric foam, comprising a longitudinally-extending channel-shaped mould (1a) and lay-down means (6) for depositing a mixture of foam reactants in said mould and comprising a vessel (40) in which liquid foam reactants may expand upwardly, supply means (28–34) for supplying liquid foam reactants to said vessel, a weir structure (50) associated with said vessel so that foam rising by expansion in said vessel will flow over said weir structure, and a downwardly inclined fall plate (41) extending between said weir structure and the bottom of the mould; characterised in that said mould (1a) is maintained stationary, said lay-down means (6) is mounted for transportation along the mould and extends downwardly within the mould to the bottom (13) of the mould, and means (7) are provided for progressively transporting said laydown means (6) from one end (12) of the mould to the other end (11) of the mould; thereby progressively to lay down partially expanded foam over the bottom of the mould.

3. Apparatus as claimed in claim 2 wherein said lay-down means (6) is mounted for transport along the upper edges of the mould side walls (1a).

4. Apparatus as defined in claim 2, wherein said vessel (40) is pivotally mounted on said lay-down means (6) and is adapted to be pivoted so as to discharge foam reactants from the vessel onto said fall plate (41).

5. Apparatus as defined in claim 2, wherein an end wall (11) of said mould (1a) is movable to permit removal of said lay-down means (6) and said transporting means (7) from the mould.

6. Apparatus as defined to claim 2, wherein said means (7) for transporting said lay-down means (6) is adapted to enter the mould and travel over the bottom of the mould.

7. Apparatus as defined to claim 2, wherein both end walls (11,12) are mounted so that each may be raised from the bottom of the mould and positioned with its lower edge adjacent the upper surface of said fall plate (41).

8. Apparatus as defined to claim 2, wherein the base (71) of said mould is removable through an end of the mould.

9. Apparatus as claimed in claim 8, wherein said mould base (71) consists in a plurality of wheeled base sections.

10. Apparatus as defined in claim 2, comprising a removable closure for the top of the mould and means for extracting gases from the mould when the mould is closed.

11. Apparatus as defined in claim 2, comprising a plurality of moulds (1a, 1b, 1c) and means (7) for moving said lay-down means (6) from one mould to another.

12. Apparatus as defined in claim 2, wherein said supply means (28–34) is mounted on said transporting means (7).

13. Apparatus as defined in claim 2, wherein said transporting means (7) is a powered vehicle.

* * * * *